(12) United States Patent
Kim et al.

(10) Patent No.: US 12,535,703 B2
(45) Date of Patent: *Jan. 27, 2026

(54) DISPLAY PANEL

(71) Applicant: Samsung Display Co., Ltd., Yongin-si (KR)

(72) Inventors: Jae-seung Kim, Hwaseong-si (KR);
Kyongsub Kim, Hwaseong-si (KR);
Tae Seop Kim, Yongin-si (KR);
Taehoon Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,864

(22) Filed: Oct. 31, 2023

(65) Prior Publication Data

US 2024/0061286 A1    Feb. 22, 2024

Related U.S. Application Data

(63) Continuation of application No. 18/081,549, filed on Dec. 14, 2022, now Pat. No. 11,835,807, which is a
(Continued)

(30) Foreign Application Priority Data

Oct. 8, 2019   (KR) .................. 10-2019-0124374

(51) Int. Cl.
*G02F 1/1333*    (2006.01)
*G02F 1/1339*    (2006.01)
(Continued)

(52) U.S. Cl.
CPC .... *G02F 1/133345* (2013.01); *G02F 1/13394* (2013.01); *G02F 1/13454* (2013.01);
(Continued)

(58) Field of Classification Search
None
See application file for complete search history.

(56) References Cited

U.S. PATENT DOCUMENTS 6,115,079 A    9/2000  Yamazaki et al.
6,115,097 A    9/2000  Yamazaki
(Continued)

FOREIGN PATENT DOCUMENTS

KR    10-2005-0029019    3/2005
KR    10-2006-0043040    5/2006
(Continued)

OTHER PUBLICATIONS

Non-Final Office Action dated Apr. 13, 2022, issued to U.S. Appl. No. 17/064,547.
(Continued)

*Primary Examiner* — Dung T Nguyen
(74) *Attorney, Agent, or Firm* — Sughrue Mion, PLLC

(57) ABSTRACT

A display substrate including a scan driving circuit, a scan line, and an insulating pattern. The scan driving circuit includes a connection electrode disposed on a plurality of insulating layers, a plurality of signal lines, and a stage circuit connected to the signal lines and overlaps a non-display area. The scan line overlaps a display area and is connected to the scan driving circuit. The insulating pattern is disposed on the insulating layers, covers the connection electrode, and makes contact with a sealant.

25 Claims, 12 Drawing Sheets

Related U.S. Application Data continuation of application No. 17/064,547, filed on Oct. 6, 2020, now Pat. No. 11,556,025.

(51) Int. Cl.
  *G02F 1/1345* (2006.01)
  *G02F 1/1362* (2006.01)
  *G02F 1/1368* (2006.01)
  *G09G 3/36* (2006.01)

(52) U.S. Cl.
  CPC .. *G02F 1/136227* (2013.01); *G02F 1/136286* (2013.01); *G02F 1/1368* (2013.01); *G09G 3/3677* (2013.01); *G09G 2300/0809* (2013.01)

(56) References Cited

U.S. PATENT DOCUMENTS

| | | | |
|---|---|---|---|
| 7,456,909 | B2 | 11/2008 | Park |
| 7,679,693 | B2 | 3/2010 | Park |
| 8,975,628 | B2 | 3/2015 | Han et al. |
| 9,581,871 | B2 * | 2/2017 | Hsu ................. G02F 1/13458 |
| 9,698,174 | B2 * | 7/2017 | Kwak ............... G02F 1/136209 |
| 11,556,025 | B2 | 1/2023 | Kim et al. |
| 11,835,807 | B2 * | 12/2023 | Kim ................. G02F 1/133345 |
| 2006/0023135 | A1 | 2/2006 | Park |
| 2006/0061711 | A1 | 3/2006 | Lee et al. |
| 2014/0340625 | A1 * | 11/2014 | Hsu ..................... G02F 1/13454 349/153 |
| 2017/0146834 | A1 | 5/2017 | Tak et al. |

FOREIGN PATENT DOCUMENTS

| | | |
|---|---|---|
| KR | 20070069407 | 7/2007 |
| KR | 10-1108782 | 2/2012 |
| KR | 10-2013-0052669 | 5/2013 |
| KR | 10-1366916 | 2/2014 |
| KR | 10-2017-0061201 | 6/2017 |
| KR | 10-2017-0077681 | 7/2017 |
| KR | 10-1791577 | 10/2017 |
| KR | 10-2018-0078925 | 7/2018 |

OTHER PUBLICATIONS

Notice of Allowance dated Sep. 15, 2022, issued to U.S. Appl. No. 17/064,547.
Non-Final Office Action dated Apr. 27, 2023, issued to U.S. Appl. No. 18/081,549.
Notice of Allowance dated Aug. 21, 2023, issued to U.S. Appl. No. 18/081,549.
Korean Office Action dated Nov. 30, 2023, in Korean Patent Application No. 10-2019-0124374 (with English translation).

* cited by examiner

DISPLAY PANEL

CROSS-REFERENCE TO RELATED APPLICATIONS

This application is a Continuation of U.S. patent application Ser. No. 18/081,549; filed on Dec. 14, 2022 (now U.S. Pat. No. 11,835,807), is a Continuation of U.S. patent application Ser. No. 17/064,547 (now U.S. Pat. No. 11,556,025); filed on Oct. 6, 2020, which claims priority from and the benefit of Korean Patent Application No. 10-2019-0124374; filed on Oct. 8, 2019, which are hereby incorporated by reference for all purposes as if fully set forth herein.

BACKGROUND

Field

Exemplary embodiments of the invention relate generally to a display panel and, more specifically, to a display panel including an integrated scan driving circuit.

Discussion of the Background

A display panel may include two display substrates. The two display substrates are coupled to each other by a sealant. One substrate among the two display substrate is an array substrate, and the other substrate among the two display substrate is a color filter substrate.

The array substrate includes gate lines, data lines, and transistors connected to the gate lines and data lines. The transistors form pixels.

The display panel includes a scan driving circuit to apply scan signals to the gate lines and a data driving circuit to apply data signals to the data lines.

The above information disclosed in this Background section is only for understanding of the background of the inventive concepts, and, therefore, it may contain information that does not constitute prior art.

SUMMARY

Exemplary embodiments of the invention provide a display panel having a relatively low number of defects.

Additional features of the inventive concepts will be set forth in the description which follows, and in part will be apparent from the description, or may be learned by practice of the inventive concepts.

An exemplary embodiment of the invention provides a display panel including a first display substrate including a display area and a non-display area disposed outside the display area, a second display substrate facing the first display substrate, and a sealant overlapping the non-display area and coupling the first display substrate and the second display substrate. The first display substrate includes a plurality of insulating layers, a scan driving circuit, a scan line, a pixel transistor, a pixel electrode, and an insulating pattern. The scan driving circuit includes a connection electrode disposed on the insulating layers, a plurality of signal lines, and a stage circuit connected to the signal lines. The scan line overlaps the display area and is connected to the scan driving circuit. The pixel transistor overlaps the display area and is connected to the scan line. The pixel electrode is disposed on the insulating layers and connected to the pixel transistor. The insulating pattern is disposed on the insulating layers, covers the connection electrode, and makes contact with the sealant.

The insulating layers may include a first insulating layer, a second insulating layer disposed on the first insulating layer, and a third insulating layer disposed on the second insulating layer, and the pixel transistor may include a control electrode disposed under the first insulating layer, an input electrode disposed between the second insulating layer and the third insulating layer, and an output electrode disposed between the second insulating layer and the third insulating layer.

The pixel electrode may be disposed on the third insulating layer and connected to the output electrode through a contact hole defined through the second insulating layer and the third insulating layer.

The connection electrode may be disposed on the same layer as the pixel electrode and may include the same material as the pixel electrode.

The signal lines may include a first signal line receiving a clock signal or a reference voltage and a second signal line connected to the stage circuit. The connection electrode may connect the first signal line and the second signal line.

Either the first signal line or the second signal line may be disposed on the same layer as the scan line.

The first signal line and the second signal line may be disposed on different layers from each other.

The insulating layers may include a first insulating layer, a second insulating layer disposed on the first insulating layer, and a third insulating layer disposed on the second insulating layer. The first signal line may be disposed under the first insulating layer, the second signal line may be disposed between the second insulating layer and the third insulating layer. The connection electrode may connect the first signal line and the second signal line through a first contact hole defined through the first insulating layer, the second insulating layer, and the third insulating layer, and a second contact hole defined through the second insulating layer and the third insulating layer.

A plurality of stage circuits and scan lines may be provided. The stage circuits may be arranged in a first direction, and the scan lines may be respectively connected to the stage circuits. The signal lines may include a first signal line extending in the first direction and a second signal line extending in a second direction crossing the first direction and connected to a corresponding stage circuit among the stage circuits. The second signal line may include a first portion and a second portion, and the connection electrode may connect the first portion and the second portion.

The stage circuit may include a first driving transistor and a second driving transistor, and the connection electrode may connect one electrode of the first driving transistor and one electrode of the second driving transistor.

The pixel transistor may have the same stack structure as the first driving transistor.

The stage circuit may include at least one driving transistor, and the connection electrode may connect one electrode of the at least one driving transistor and a corresponding signal line among the signal lines.

The display panel further may include a metal particle mixed with the sealant, and the metal particle may make contact with at least one of the insulating pattern and the second display substrate.

The second display substrate may include a base substrate and a common electrode disposed on an inner surface of the base substrate. The metal particle may make contact with the common electrode.

The display panel further may include a spacer disposed between the first display substrate and the second display substrate. The spacer and the insulating pattern may include the same material.

The scan line may receive a turn-on signal of the pixel transistor from the scan driving circuit.

Another exemplary embodiment of the invention provides a first display substrate including a scan driving circuit, a plurality of scan lines, pixel transistors, a pixel electrode, and an insulating pattern. The scan driving circuit includes a first signal line, a second signal line, a connection electrode connecting the first signal line and the second signal line and disposed on a layer different from the first signal line and the second signal line, and a plurality of stage circuits. The scan lines respectively receive scan signals from the stage circuits. The pixel transistors are connected to the scan lines. The insulating pattern makes contact with the sealant and protects the connection electrode from the sealant.

Another exemplary embodiment of the invention provides a display panel including a first display substrate including a display area and a non-display area disposed outside the display area, a second display substrate facing the first display substrate and including a common electrode, a sealant making contact with the common electrode, and a conductive foreign substance mixed with the sealant. The first display substrate includes a pixel electrode disposed in the display area, a first signal line disposed in the non-display area, a second signal line disposed in the non-display area, a connection electrode disposed in the non-display area, connecting the first signal line and the second signal line, and disposed on a layer different from the first signal line and the second signal line, and an insulating pattern covering the connection electrode and making contact with the sealant.

According to the above, since the insulating pattern protects the connection electrode, defects of the scan driving circuit may be prevented. The conductive foreign substance may infiltrate the sealant composition when the sealant is formed. The insulating pattern covers the connection electrode to prevent electrical defects from occurring, which are caused when the conductive foreign substance makes contact with the connection electrode.

In particular, although the foreign substance, such as metal, infiltrates the sealant composition, the short circuit caused by the metal foreign substance between the common electrode and the connection electrode may be prevented. Since the insulating pattern is formed in the process of forming the spacer, no additional process is required when the display panel is manufactured, and no additional cost is incurred.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
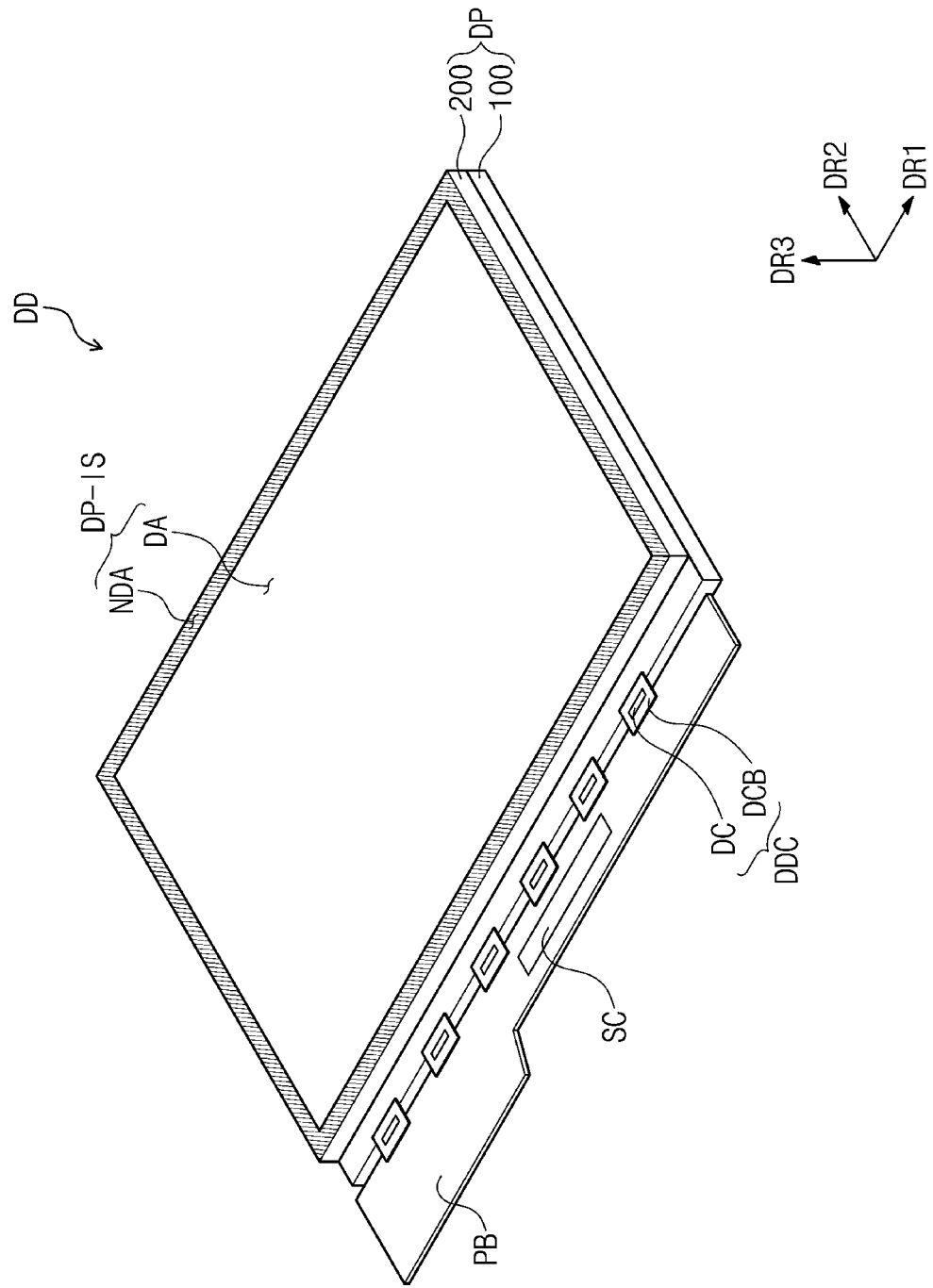
FIG. 1 is a perspective view showing a display device according to an exemplary embodiment of the invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In the following descriptions, the present disclosure will be explained in detail with reference to the accompanying drawings. It will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the inventive concepts will be explained in detail with reference to the accompanying drawings.

Figure 2:
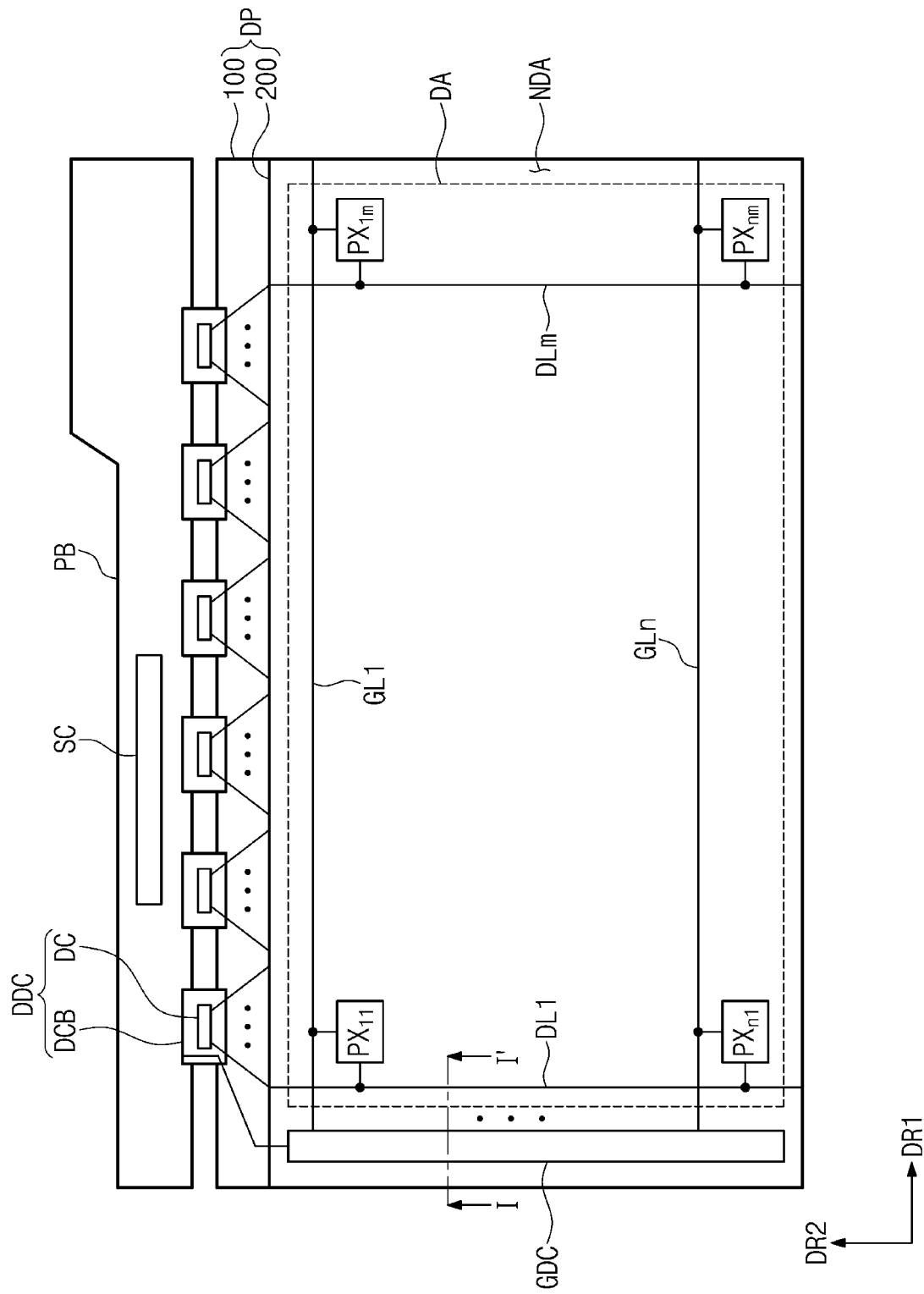
FIG. 2 is a plan view showing a display device according to an exemplary embodiment of the invention.
Figure 3:
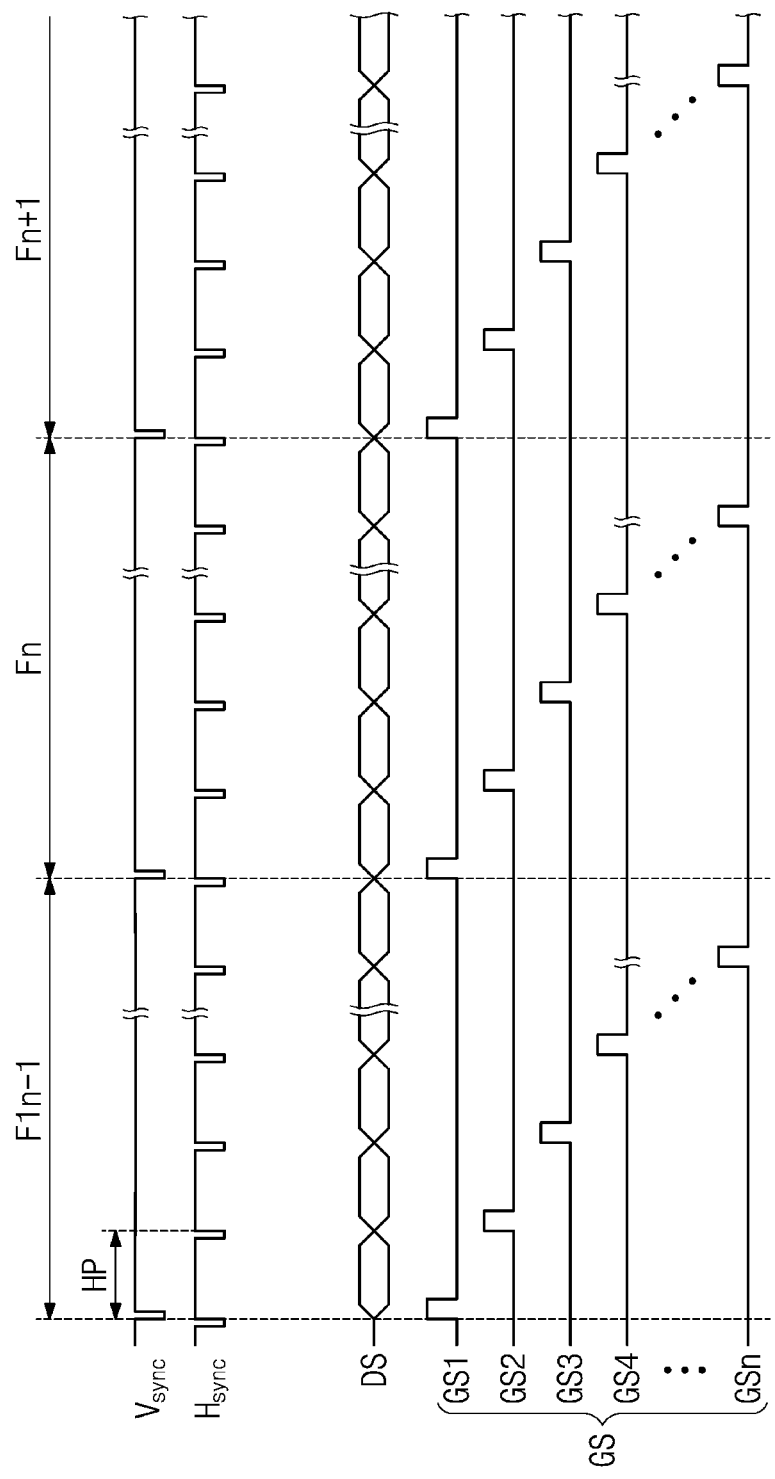
FIG. 3 is a timing diagram of driving signals according to an exemplary embodiment of the invention.

FIG. 1 is a perspective view showing a display device DD according to an exemplary embodiment of the invention. FIG. 2 is a plan view showing the display device DD according to an exemplary embodiment of the invention. FIG. 3 is a timing diagram of driving signals according to an exemplary embodiment of the invention.

Referring to FIGS. 1 and 2, the display device DD includes a display panel DP, data driving units DDC, a main circuit board PB, a scan driving circuit GDC, and a signal control circuit SC. Although not shown separately, the display device DD may further include a chassis member or a molding member, and may further include a backlight unit depending on the type of the display panel DP.

The display panel DP may be one of a liquid crystal display panel, a plasma display panel, an electrophoretic display panel, a microelectromechanical system (MEMS) display panel, an electrowetting display panel, and an organic light emitting display panel, and should not be particularly limited.

In the present exemplary embodiment, the scan driving circuit GDC will be described as a scan driving circuit. However, the inventive concepts should not be limited thereto or thereby. The scan driving circuit GDC may generate a variety of scan signals rather than a scan signal depending on the type of the display panel DP, and it is sufficient that the scan driving circuit GDC generates a scan signal.

The display panel DP may include a first display substrate 100 and a second display substrate 200 facing the first display substrate 100 and being spaced apart from the first display substrate 100. A predetermined cell gap may be defined between the first display substrate 100 and the second display substrate 200. A grayscale display layer may be disposed between the first display substrate 100 and the second display substrate 200 to generate an image. The grayscale display layer may be a display element layer, such as a liquid crystal layer, an organic light emitting layer, and an electrophoretic layer, depending on the type of the display panel.

As shown in FIG. 1, the display panel DP may display the image through a display surface DP-IS. The display surface DP-IS may be substantially parallel to a surface defined by a first direction DR1 and a second direction DR2. The display surface DP-IS may include a display area DA and a non-display area NDA. The non-display area NDA may be defined along an edge of the display surface DP-IS and may surround the display area DA. The display area DA may be defined as the same area in the first display substrate 100 and the second display substrate 200.

A third direction DR3 may indicate a normal line direction of the display surface DP-IS, i.e., a thickness direction of the display panel DP. Front (or upper) and rear (or lower) surfaces of each layer or each unit described hereinafter may be distinguished from each other by the third direction DR3. However, the first, second, and third directions DR1, DR2, and DR3 shown in the present exemplary embodiment are merely exemplary. Hereinafter, the first, second, and third directions are directions respectively indicated by the first, second, and third directions DR1, DR2, and DR3, and are assigned with the same reference numerals.

In the exemplary embodiment of the invention, the display panel DP includes a flat display surface. However, the inventive concepts should not be limited thereto or thereby. The display device DD may include a curved display surface or a three-dimensional display surface. The three-dimensional display surface may include a plurality of display areas facing different directions from each other.

A sealant (not shown) is disposed between the first display substrate 100 and the second display substrate 200 to couple the first display substrate 100 and the second display substrate 200. The sealant is disposed in the non-display area NDA and is disposed along an edge of the first display substrate 100 to have a closed line shape. The cell gap is maintained by the sealant.

Each of the data driving units DDC may include a circuit board DCB and a driving chip DC. The circuit board DCB may have a structure in which an insulating layer and a conductive layer are stacked. The conductive layer may include a plurality of signal lines. The data driving unit DDC may be coupled to the first display substrate 100 to be electrically connected to the signal line of the display panel DP. The coupling structure between the data driving unit DDC and the display panel DP should not be particularly limited.

The main circuit board PB may be connected to the circuit board DCB of the data driving unit DDC. The main circuit board PB may be electrically connected to the circuit board DCB of the data driving unit DDC using an anisotropic conductive film or a solder ball. The signal control circuit SC may be mounted on the main circuit board PB. The signal control circuit SC may receive image data and control signals from an external graphic controller (not shown). The signal control circuit SC may provide a control signal to the data driving unit DDC. In an exemplary embodiment of the invention, the driving chip DC of the data driving unit DDC may be mounted on the main circuit board PB.

FIG. 2 shows an arrangement of the signal lines GL1 to GLn and DL1 to DLm and the pixels PX11 to PXnm, which are included in the display panel DP, in a plan view. The signal lines GL1 to GLn and DL1 to DLm may include a plurality of gate lines GL1 to GLn and a plurality of data lines DL1 to DLm. In the present exemplary embodiment, the gate lines GL1 to GLn are shown as a representative example of the scan lines.

The gate lines GL1 to GLn extend in the first direction DR1 and are arranged in the second direction DR2, and the data lines DL1 to DLm are insulated from the gate lines GL1 to GLn while crossing the gate lines GL1 to GLn. The gate lines GL1 to GLn and the data lines DL1 to DLm are disposed to overlap the display area DA.

The gate lines GL1 to GLn are connected to the scan driving circuit GDC. The scan driving circuit GDC is disposed at one side of the display panel DP, although the gate driving circuit GDC may be disposed at both sides of the display panel DP in the first direction DR1. In the present exemplary embodiment, the gate driving circuit GDC may be integrated in the display panel DP through an oxide silicon gate driver circuit (OSG) or amorphous silicon gate driver circuit (ASG) process.

Each of the pixels PX11 to PXnm may be connected to a corresponding gate line among the gate lines GL1 to GLn and a corresponding data line among the data lines DL1 to DLm. Each of the pixels PX11 to PXnm may include a pixel driving circuit and a display element.

The pixels PX11 to PXnm may be classified into a plurality of groups depending on colors displayed thereby. The pixels PX11 to PXnm may display one of primary colors. The primary colors may include, but not limited to, a red color, a green color, and a blue color. The primary colors may further include a yellow color, a cyan color, and a magenta color. The pixels PX11 to PXnm may be arranged in a matrix form. However, the inventive concepts should not be limited thereto or thereby. That is, the pixels PX11 to PXnm may be arranged in a pentile form.

The scan driving circuit GDC and the data driving unit DDC receive control signals from the signal control circuit SC. The signal control circuit SC receives the image data and the control signals from the external graphic controller (not shown).

As shown in FIG. 3, the control signals may include a vertical synchronization signal Vsync serving as a signal to distinct frame periods Fn−1, Fn, and Fn+1, a horizontal synchronization signal Hsync serving as a row distinction signal to distinct horizontal periods HP, a data enable signal maintained at a high level during a period in which data are output, to indicate a data input period, and clock signals.

The scan driving circuit GDC may generate scan signals GS1 to GSn in response to the control signal (hereinafter, referred to as a "gate control signal") provided from the signal control circuit SC during the frame periods Fn−1, Fn, and Fn+1, and may apply the scan signals GS1 to GSn to the gate lines GL1 to GLn, respectively. The scan signals GS1 to GSn may be sequentially output to correspond to the horizontal periods HP. The scan signals GS1 to GSn may serve as turn-on signals for pixel transistors TR, to be described later.

The data driving unit DDC may generate grayscale voltages corresponding to the image data provided from the signal control circuit SC in response to the control signal (hereinafter, referred to as a "data control signal") provided from the signal control circuit SC. The data driving unit DDC may apply the grayscale voltages to the data lines DL1 to DLm as data voltages DS.

The data voltages DS may include positive (+) data voltages having a positive polarity with respect to a common voltage and/or negative (−) data voltages having a negative polarity with respect to the common voltage. A portion of the data voltages applied to the data lines DL1 to DLm during each horizontal period HP has the positive polarity, and the other portion of the data voltages applied to the data lines DL1 to DLm during each horizontal period HP has the negative polarity.

Figure 4:
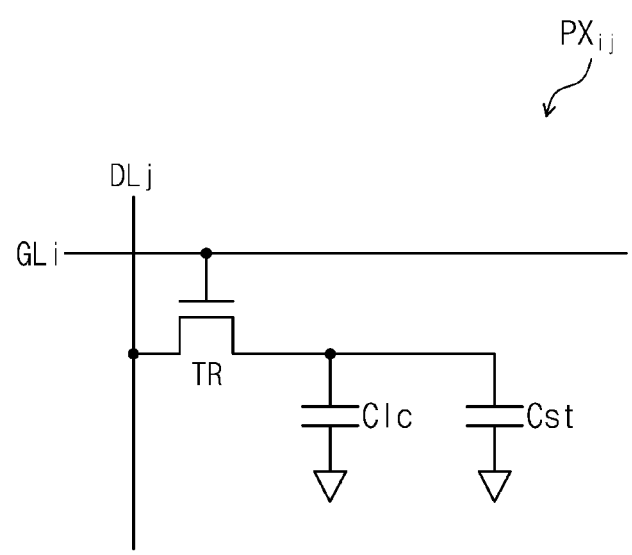
FIG. 4 is an equivalent circuit diagram showing a pixel according to an exemplary embodiment of the invention.
Figure 5:
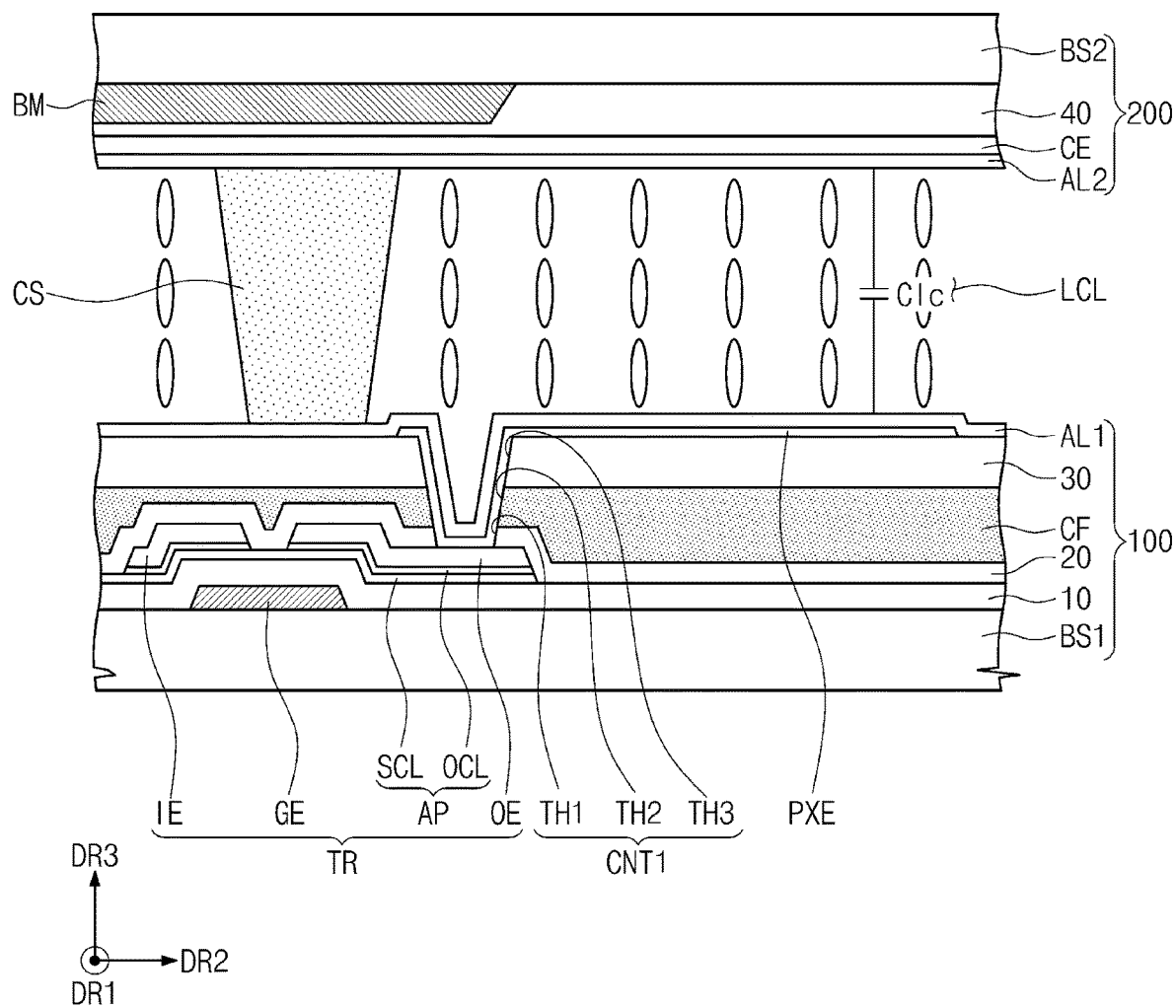
FIG. 5 is a cross-sectional view showing a display panel according to an exemplary embodiment of the invention.

FIG. 4 is an equivalent circuit diagram showing a pixel PXij according to an exemplary embodiment of the invention. FIG. 5 is a cross-sectional view showing the display panel DP according to an exemplary embodiment of the invention.

FIG. 4 shows the pixel PXij connected to an i-th gate line GLi and a j-th data line DLj as a representative example. Hereinafter, the liquid crystal display panel will be described as a representative example of the display panel DP. FIG. 4 shows the equivalent circuit diagram with respect to the pixel PXij among the pixels PX11 to PXnm, and the pixels PX11 to PXnm shown in FIG. 2 may have substantially the same structure as the pixel PXij.

The pixel PXij may include the pixel transistor TR, a liquid crystal capacitor Clc, and a storage capacitor Cst. In an exemplary embodiment of the invention, the storage capacitor Cst may be omitted. In an exemplary embodiment of the invention, the pixel PXij may include a greater number of transistors and may include two or more liquid crystal capacitors.

The pixel transistor TR is electrically connected to the i-th gate line GLi and the j-th data line DLj. The pixel transistor TR outputs a pixel voltage corresponding to the data signal provided from the j-th data line DLj in response to the scan signal provided from the i-th gate line GLi.

The liquid crystal capacitor Clc is charged with the pixel voltage output from the pixel transistor TR. An alignment of liquid crystal directors included in a liquid crystal layer LCL (refer to FIG. 5) is changed in accordance with an amount of electric charges charged in the liquid crystal capacitor Clc. A light incident to the liquid crystal layer transmits through or is blocked by the alignment of the liquid crystal directors.

The storage capacitor Cst is connected to the liquid crystal capacitor Clc in parallel. The storage capacitor Cst maintains the alignment of the liquid crystal directors for a predetermined period.

FIG. 5 shows the cross-section corresponding to the pixel PXij. Referring to FIG. 5, a plurality of insulating layers 10, 20, and 30, the pixel transistor TR, and a pixel electrode PXE are disposed on one surface of a first base substrate BS1. In FIG. 5, the gate line and the data line connected to the pixel transistor TR are omitted.

The first base substrate BS1 may be a glass substrate or a plastic substrate. A control electrode GE may be disposed on an inner surface (an upper surface of FIG. 5) of the first base substrate BS1. The control electrode GE may be a portion of the corresponding gate line or may extend from the corresponding gate line in a plan view. A first insulating layer 10 may be disposed on the one surface of the first base substrate BS1 to cover the control electrode GE. The first insulating layer 10 may include at least one of an inorganic material and an organic material. In the present exemplary embodiment, the first insulating layer 10 may be an inorganic layer. The first insulating layer 10 may include a silicon nitride layer, a silicon oxynitride layer, a silicon oxide layer, a titanium oxide layer, or an aluminum oxide layer.

An active pattern AP is disposed on the first insulating layer 10 to overlap the control electrode GE. The active pattern AP includes a semiconductor layer SCL and an ohmic contact layer OCL. The semiconductor layer SCL is disposed on the first insulating layer 10, and the ohmic contact layer OCL is disposed on the semiconductor layer SCL.

The semiconductor layer SCL may include amorphous silicon or polysilicon. In addition, the semiconductor layer SCL may include a metal oxide semiconductor. The ohmic contact layer OCL may be doped with a higher concentration of dopants than the semiconductor layer. The ohmic contact layer OCL may include two portions spaced apart from each other. In an exemplary embodiment of the invention, the ohmic contact layer OCL may have a single body shape.

An input electrode IE and an output electrode OE are disposed on the active pattern AP. A second insulating layer 20 is disposed on the first insulating layer 10 to cover the input electrode IE and the output electrode OE. The second insulating layer 20 may include at least one of an inorganic material and an organic material. In the present exemplary embodiment, the second insulating layer 20 may be an inorganic layer. The second insulating layer 20 may include a silicon nitride layer, a silicon oxynitride layer, a silicon oxide layer, a titanium oxide layer, or an aluminum oxide layer.

A color filter CF may be disposed on the second insulating layer 20. The color filter CF may include one color of red, green, and blue colors. In an exemplary embodiment of the invention, the color filter CF may be omitted. The color filter CF may be disposed on the second display substrate 200.

A third insulating layer 30 may be disposed on the color filter CF. The third insulating layer 30 may be an organic layer that provides a flat surface. The third insulating layer may include an acrylic-based resin.

The pixel electrode PXE may be disposed on the third insulating layer 30. The pixel electrode PXE may include a transparent conductive oxide (TCO). The pixel electrode PXE may include indium tin oxide (ITO), indium zinc oxide (IZO), zinc oxide (ZnO), indium tin zinc oxide (ITZO), PEDOT, metal nanowire, or graphene.

The pixel electrode PXE may be connected to the output electrode OE through a contact hole CNT1 defined through the second insulating layer 20, the color filter CF, and the third insulating layer 30. A first through-hole TH1 may be defined through the second insulating layer 20 to expose the output electrode OE, a second through-hole TH2 may be defined through the color filter CF to correspond to the first through-hole TH1, and a third through-hole TH3 may be defined through the third insulating layer 30 to correspond to the second through-hole TH2.

A first alignment layer AL1 may be disposed on the third insulating layer 30 to cover the pixel electrode PXE. The first alignment layer AL1 may include a polyimide resin.

Referring to FIG. 5, a light blocking pattern BM may be disposed on a lower surface of a second base substrate BS2. The second base substrate BS2 may be a glass substrate or a plastic substrate. In addition, the light blocking pattern BM may overlap the gate line GLi (refer to FIG. 4) and the data line DLj (refer to FIG. 4).

Insulating layers may be disposed on an inner surface (a lower surface of FIG. 5) of the second base substrate BS2 to cover the light blocking pattern BM. FIG. 5 shows a fourth insulating layer 40 that provides a flat surface as a representative example. The fourth insulating layer 40 may be an organic layer.

A common electrode CE may be disposed on a lower surface of the fourth insulating layer 40. The common voltage may be applied to the common electrode CE. The common voltage and the pixel voltage may have different values from each other. A second alignment layer AL2 may be disposed on a lower surface of the common electrode CE.

A spacer CS may be disposed between the first display substrate 100 and the second display substrate 200. The spacer CS may maintain the cell gap. The spacer CS may include an insulating material. The spacer CS may include a synthetic resin. The spacer CS may include a photosensitive organic material. The spacer CS may overlap an area where the light blocking pattern BM is disposed in the display area DA. The spacer CS may overlap the pixel transistor TR. Meanwhile, the cross-section of the display panel DP shown in FIG. 5 is merely exemplary. The first display substrate 100 and the second display substrate 200 may be turned upside down in the third direction DR3.

In the above descriptions, a vertical alignment mode liquid crystal display panel has been described as a representative example. However, the inventive concepts are not so limited, and an in-plane switching (IPS) mode, fringe-field switching (FFS) mode, or plane to line switching (PLS) mode liquid crystal display panel may be applied to the display panel DP.

Figure 6:
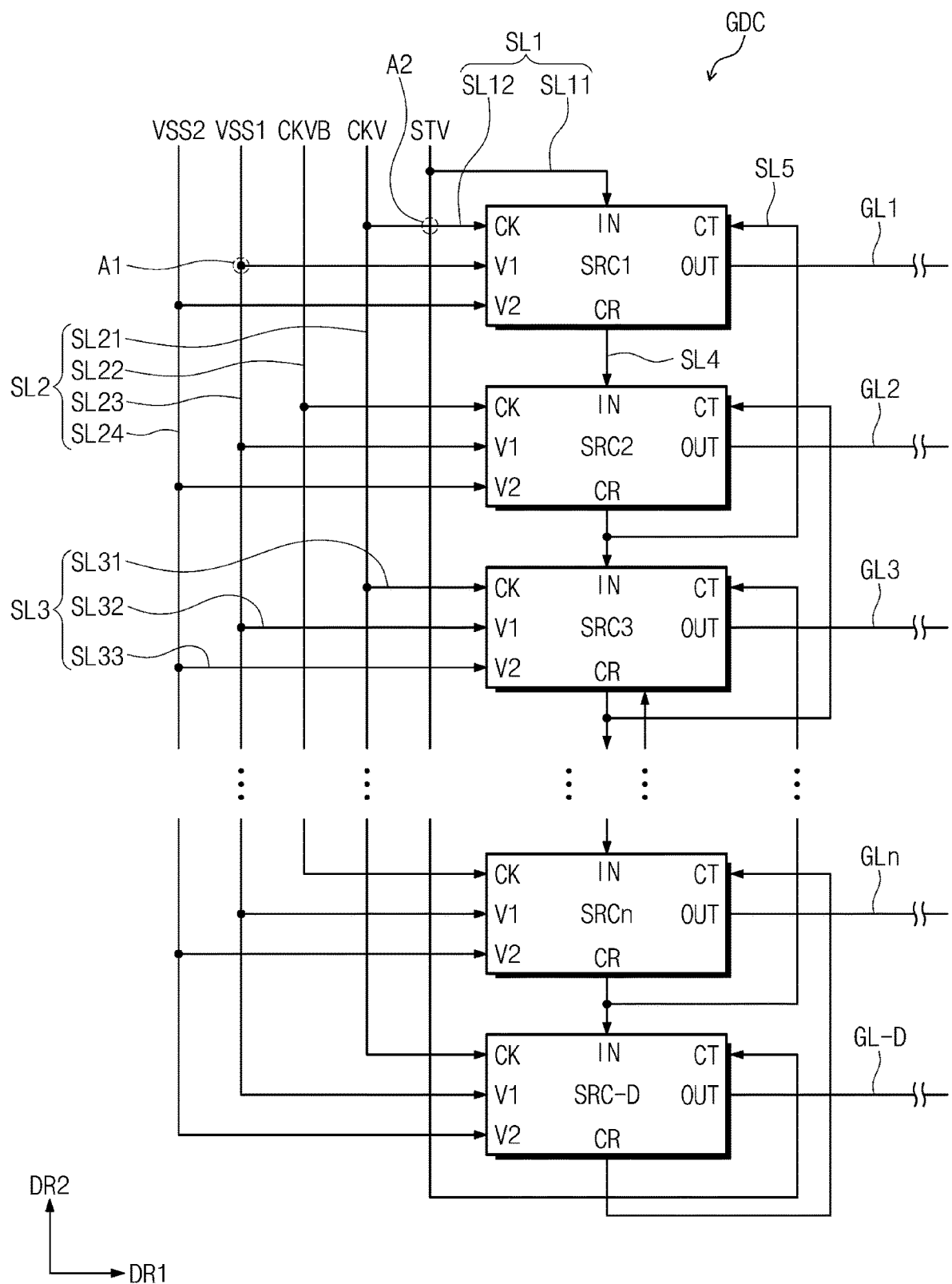
FIG. 6 is a block diagram showing a scan driving circuit according to an exemplary embodiment of the invention.
Figure 7:
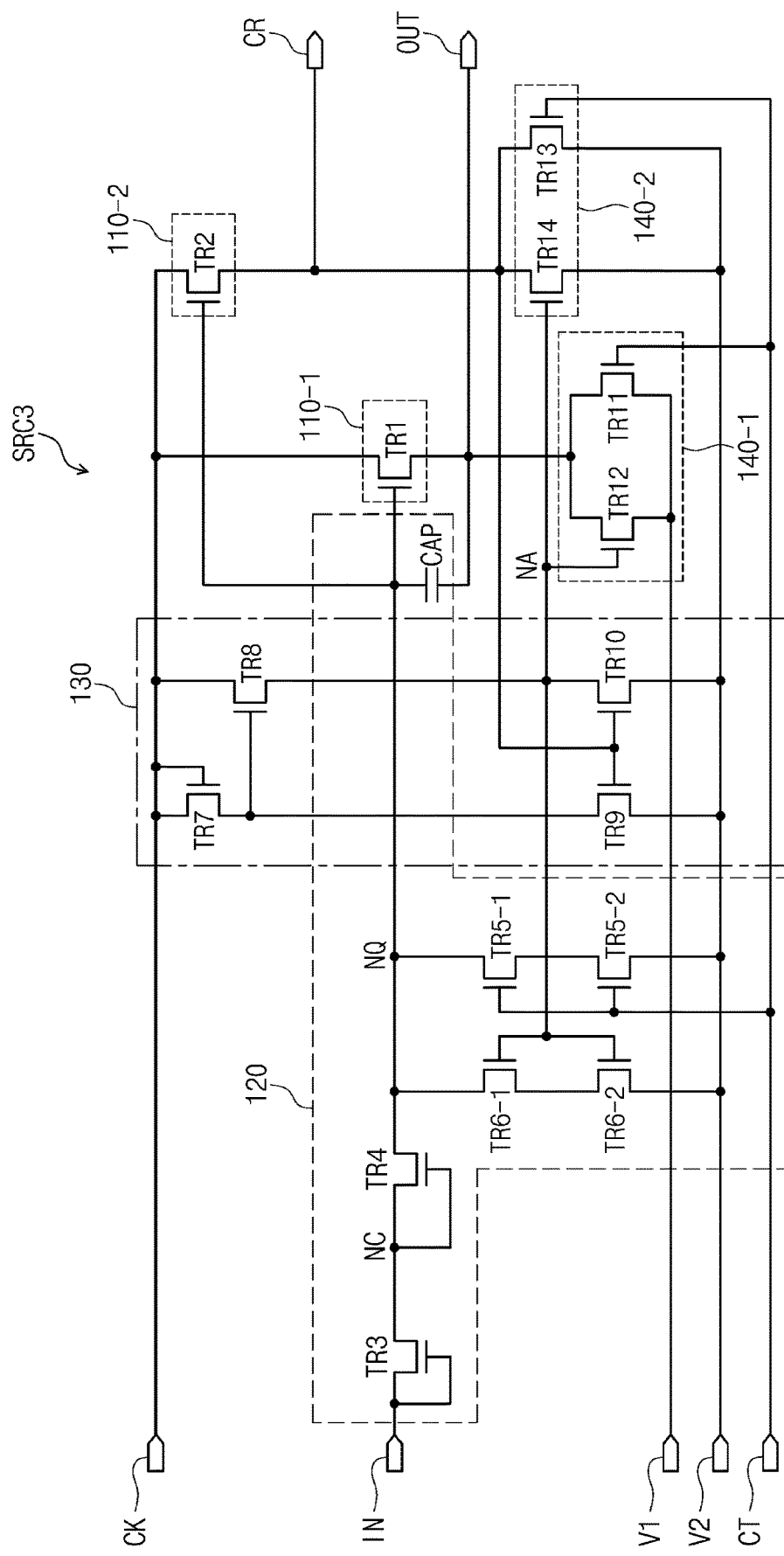
FIG. 7 is an equivalent circuit diagram showing a stage circuit according to an exemplary embodiment of the invention.

FIG. 6 is a block diagram showing the scan driving circuit GDC according to an exemplary embodiment of the invention. FIG. 7 is a circuit diagram showing a stage circuit SRC3 according to an exemplary embodiment of the invention.

FIG. 6 shows the scan driving circuit GDC shown in FIG. 2 in detail. The scan driving circuit GDC shown in FIG. 6 may overlap the non-display area NDA.

The scan driving circuit GDC may include a plurality of signal lines SL1, SL2, SL3, SL4, and SL5 and a plurality of stage circuits SRC1 to SRCn connected to the signal lines SL1, SL2, SL3, SL4, and SL5. The stage circuits SRC1 to SRCn may be arranged in the second direction DR2. The stage circuits SRC1 to SRCn may be connected to each other one after another. The stage circuits SRC1 to SRCn may be connected to the gate lines GL1 to GLn, respectively. The stage circuits SRC1 to SRCn may apply the scan signals GS1 to GSn (refer to FIG. 3) to the gate lines GL1 to GLn, respectively. In the exemplary embodiment, the gate lines GL1 to GLn connected to the stage circuits SRC1 to SRCn may be odd-numbered gate lines or even-numbered gate lines of all the gate lines.

The scan driving circuit GDC may further include a dummy stage circuit SRC-D connected to the last stage circuit SRCn among the stage circuits SRC1 to SRCn. The dummy stage circuit SRC-D may be connected to a dummy gate line GL-D.

The signal lines SL1, SL2, SL3, SL4, and SL5 may include a first signal line SL1 that provides a start signal STV. The first signal line SL1 may include a first sub-signal line SL11 connected to a first stage circuit SRC1 among the stage circuits SRC1 to SRCn and a second sub-signal line SL12 connected to the dummy stage circuit SRC-D.

The signal lines SL1, SL2, SL3, SL4, and SL5 may include a second signal line SL2 that receives clock signals CKV and CKVB or reference voltages VSS1 and VSS2. The second signal line SL2 may extend in the second direction DR2.

The second signal line SL2 may include a first sub-signal line SL21 that receives a first clock signal CKV, a second sub-signal line SL22 that receives a second clock signal CKVB, a third sub-signal line SL23 that receives a first reference voltage VSS1, and a fourth sub-signal line SL24 that receives a second reference voltage VSS2. The first clock signal CKV and the second clock signal CKVB may be clock signals having opposite phases to each other. The first reference voltage VSS1 and the second reference voltage VSS2 may be bias voltages having different levels from each other. In the present exemplary embodiment, the reference voltages VSS1 and VSS2 may be discharge voltages.

The signal lines SL1, SL2, SL3, SL4, and SL5 may include a third signal line SL3 connected to the second signal line SL2. The third signal line SL3 may extend in the first direction DR1. The third signal line SL3 may include a first sub-signal line SL31 connected to the first sub-signal line SL21 or the second sub-signal line SL22, a second sub-signal line SL32 connected to the third sub-signal line SL23, and a third sub-signal line SL33 connected to the fourth sub-signal line SL24. When odd-numbered stage circuits receive the first clock signal CKV, even-numbered stage circuits may receive the second clock signal CKVB.

The signal lines SL1, SL2, SL3, SL4, and SL5 may include a fourth signal line SL4 that provides a signal output from a previous stage circuit to a next stage circuit among the stage circuits SRC1 to SRCn. The signal lines SL1, SL2, SL3, SL4, and SL5 may include a fifth signal line SL5 that provides a signal output from a next stage circuit to a previous stage circuit among the stage circuits SRC1 to SRCn.

Each of the stage circuits SRC1 to SRCn may include an output terminal OUT, a carry terminal CR, an input terminal IN, a control terminal CT, a clock terminal CK, a first voltage input terminal V1, and a second voltage input terminal V2.

The output terminal OUT of each of the stage circuits SRC1 to SRCn may be connected to the corresponding gate line of the gate lines GL1 to GLn. The scan signals GS1 to GSn generated by the stage circuits SRC1 to SRCn may be applied to the gate lines GL1 to GLn through the output terminals OUT.

The carry terminal CR of each of the stage circuits SRC1 to SRCn may be electrically connected to the input terminal IN of a next stage circuit of a corresponding stage circuit. The carry terminal CR of each of the stage circuits SRC1 to SRCn may output a carry signal.

The input terminal IN of each of the stage circuits SRC1 to SRCn may receive the carry signal from a previous stage circuit of the corresponding stage circuit. For instance, the input terminal IN of a third stage circuit SRC3 may receive the carry signal from a second stage circuit SRC2. Among the stage circuits SRC1 to SRCn, the input terminal IN of a first stage circuit SRC1 may receive the start signal STV to start an operation of the scan driving circuit GDC instead of the carry signal of the previous stage circuit.

The control terminal CT of each of the stage circuits SRC1 to SRCn may be electrically connected to the carry terminal CR of the next stage circuit of the corresponding stage circuit. The control terminal CT of each of the stage circuits SRC1 to SRCn may receive the carry signal from the next stage circuit of the corresponding stage circuit. For instance, the control terminal CT of the second stage circuit SRC2 may receive the carry signal output from the carry terminal CR of the third stage circuit SRC3. In an exemplary embodiment of the invention, the control terminal CT of each of the stage circuits SRC1 to SRCn may be electrically connected to the output terminal OUT of the next stage circuit of the corresponding stage circuit.

The control terminal CT of the last stage circuit SRCn may receive the carry signal output from the carry terminal CR of the dummy stage circuit SRC-D. The control terminal CT of the dummy stage circuit SRC-D may receive the start signal STV.

The clock terminal CK of each of the stage circuits SRC1 to SRCn may receive one of the first clock signal CKV and the second clock signal CKVB. Among the stage circuits SRC1 to SRcn, the clock terminals CK of odd-numbered stage circuits SRC1 and SRC3 may respectively receive the first clock signal CKV. Among the stage circuits SRC1 to SRCn, the clock terminals CK of even-numbered stage circuits SRC2 and SRCn may respectively receive the second clock signal CKVB.

The first voltage input terminal V1 of each of the stage circuits SRC1 to SRCn may receive the first reference voltage VSS1. The second voltage input terminal V2 of each of the stage circuits SRC1 to SRCn may receive the second reference voltage VSS2. The second reference voltage VSS2 may have a level less than the first reference voltage VSS1.

According to the circuit configurations of the stage circuits SRC1 to SRCn, each of the stage circuits SRC1 to SRCn may further include other terminals, or one of the output terminal OUT, the input terminal IN, the carry terminal CR, the control terminal CT, the clock terminal CK, the first voltage input terminal V1, and the second voltage input terminal V2 may be omitted in each of the stage circuits SRC1 to SRCn. For instance, one of the first voltage input terminal V1 and the second voltage input terminal V2 may be omitted. In addition, the connection relationship between the stage circuits SRC1 to SRCn may be changed.

FIG. 7 shows the third stage circuit SCR3 among the stage circuits SRC1 to SRCn as a representative example. Each of the stage circuits SRC1 to SRCn shown in FIG. 6 may have substantially the same circuit configuration as that shown in FIG. 7.

Referring to FIG. 7, the third stage circuit SRC3 may include a plurality of transistors. The third stage circuit SRC3 may include output parts 110-1 and 110-2, a control part 120, an inverter part 130, and pull-down parts 140-1 and 140-2. The transistors may be included in the output parts 110-1 and 110-2, the control part 120, the inverter part 130, and the pull-down parts 140-1 and 140-2 depending on its function. The circuit configuration of the third stage circuit SRC3 is merely exemplary and may be modified from what is shown in FIG. 7.

A first output part 110-1 may include a first output transistor TR1. The first output transistor TR1 may include an input electrode receiving the first clock signal CKV, a control electrode connected to a first node NQ, and an output electrode outputting a third scan signal GS3. A second output part 110-2 may include a second output transistor TR2. The second output transistor TR2 may include an input electrode receiving the first clock signal CKV, a control electrode connected to the first node NQ, and an output electrode outputting a third carry signal.

The control part 120 may control operations of the first and second output parts 110-1 and 110-2. The control part 120 may turn on the first and second output parts 110-1 and 110-2 in response to a second carry signal output from the second stage circuit SRC2. The control part 120 may turn off the first and second output parts 110-1 and 110-2 in response to a fourth carry signal output from a fourth stage circuit SRC4. Further, the control part 120 may maintain the turned-off state of the first and second output parts 110-1 and 110-2 in accordance with a switching signal output from the inverter part 130.

The control part 120 may include a first control transistor TR3, a second control transistor TR4, third control transistors TR5-1 and TR5-2, fourth control transistors TR6-1 and TR6-2, and a capacitor CAP. In the present exemplary embodiment, two third control transistors TR5-1 and TR5-2 connected to each other in series and two fourth control transistors TR6-1 and TR6-2 connected to each other in series are shown as a representative example.

The first control transistor TR3 may output a first control signal, which controls an electric potential of the first node NQ, to a second node NC before the third scan signal GS3 is output. The second control transistor TR4 may be diode-connected between the second node NC and the first node NQ to form a current path from the second node NC to the first node NQ.

The capacitor CAP may be connected between the output electrode of the first output transistor TR1 and the control electrode (or the first node NQ) of the first output transistor TR1. The two third control transistors TR5-1 and TR5-2 may be connected between the second voltage input terminal V2 and the first node NQ.

The two fourth control transistors TR6-1 and TR6-2 may be connected between the second voltage input terminal V2 and the first node NQ. Control electrodes of the two third control transistors TR5-1 and TR5-2 may be commonly connected to a third node NA.

Referring to FIG. 7, the inverter part 130 may output the switching signal to the third node NA. The inverter part 130 may include first, second, third, and fourth inverter transistors TR7, TR8, TR9, and TR10. The first inverter transistor TR7 may include input and control electrodes, which are commonly connected to the clock terminal CK, and an output electrode connected to a control electrode of the second inverter transistor TR8. The second inverter transistor TR8 may include an input electrode connected to the clock terminal CK and an output electrode connected to the third node NA.

The third inverter transistor TR9 may include an output electrode connected to the output electrode of the first inverter transistor TR7, a control electrode connected to the carry terminal CR, and an input electrode connected to the second voltage input terminal V2. The fourth inverter transistor TR10 may include an output electrode connected to the third node NA, a control electrode connected to the carry terminal CR, and an input electrode connected to the second voltage input terminal V2.

The first pull-down part 140-1 may include a first pull-down transistor TR11 and a second pull-down transistor TR12. The first pull-down part 140-1 may provide the first reference voltage VSS1 to the output electrode of the first output transistor TR1 and may provide the first reference voltage VSS1 to the output electrode of the first output transistor TR1 in response to the switching signal output from the third node NA. The second pull-down part 140-2 may include a third pull-down transistor TR13 and a fourth pull-down transistor TR14. The second pull-down part 140-2 may provide the second reference voltage VSS2 to the output electrode of the second output transistor TR2 in response to the fourth carry signal and may provide the second reference voltage VSS2 to the output electrode of the second output transistor TR2 in response to the switching signal output from the third node NA.

Figure 8A:
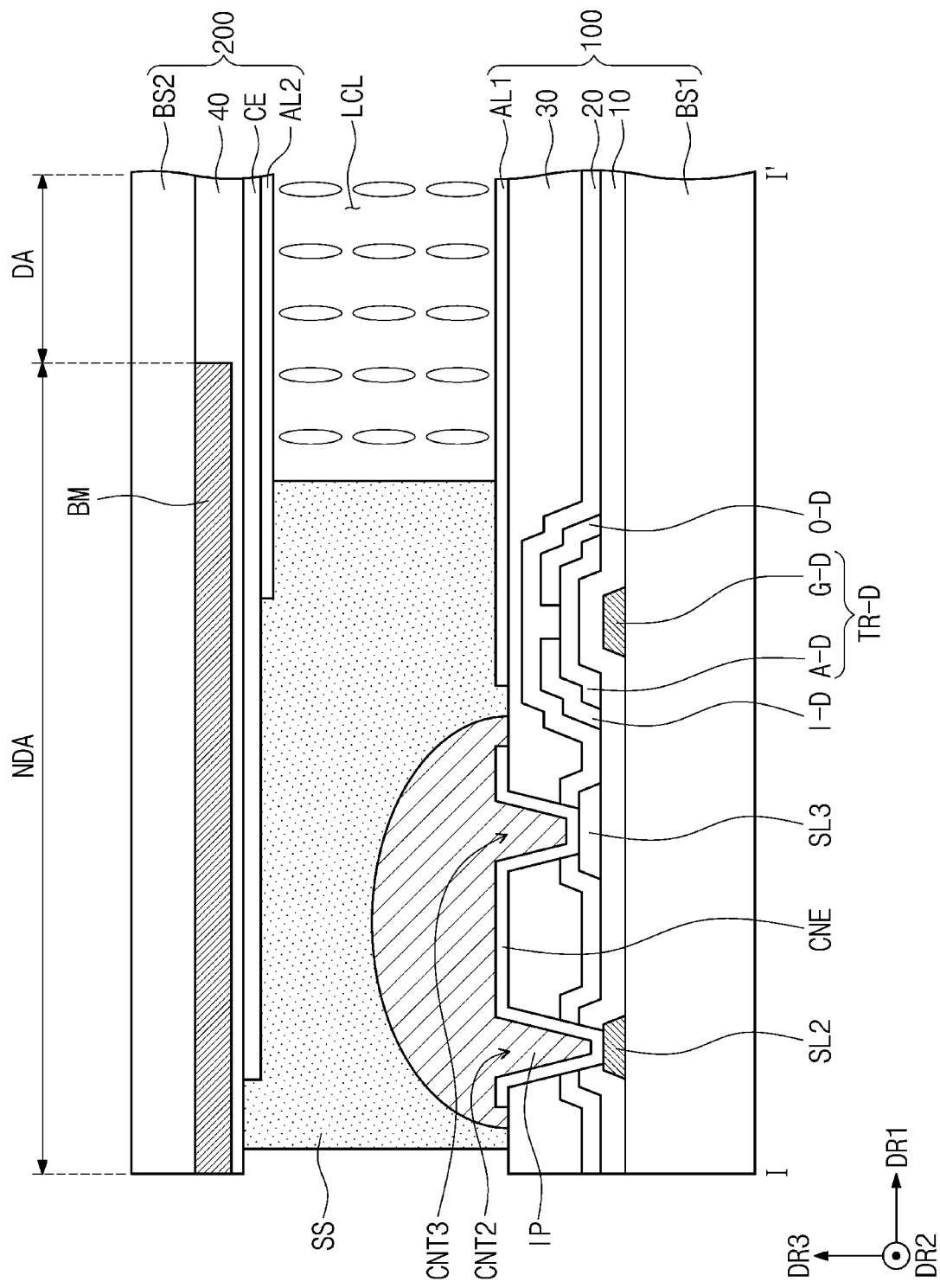
FIGS. 8A and 8B are cross-sectional views showing a display panel according to an exemplary embodiment of the invention.
Figure 8B:
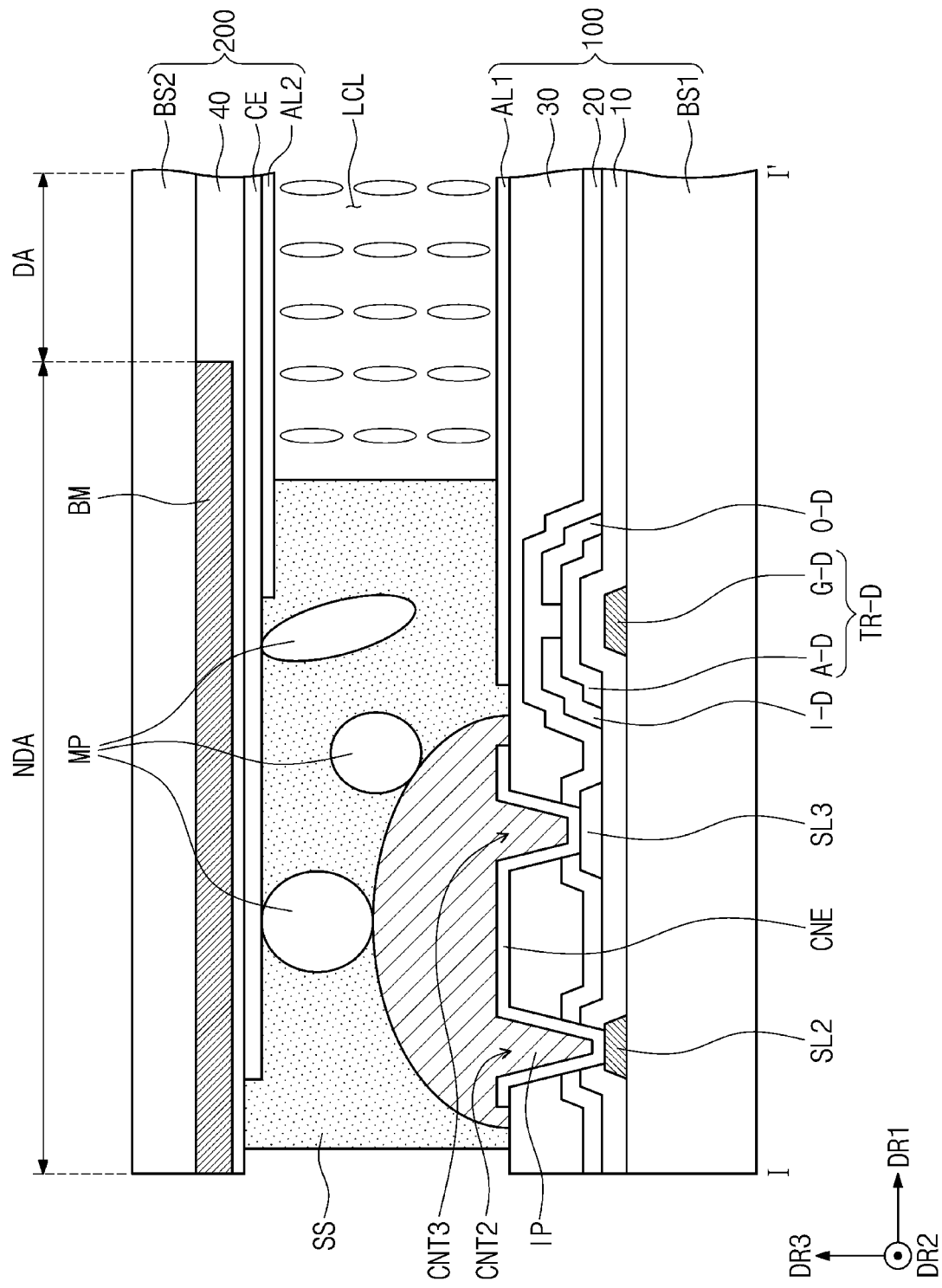

FIGS. 8A and 8B are cross-sectional views showing the display panel DP according to an exemplary embodiment of the invention. FIGS. 8A and 8B show cross-sections taken along a line I-I' of FIG. 2. Hereinafter, in FIGS. 8A and 8B, detailed descriptions of the same elements as the elements described with reference to FIGS. 1 to 7 will be omitted.

In the present exemplary embodiment, one sealant SS that couples the first display substrate 100 and the second display substrate 200 is shown. However, the inventive concepts should not be limited thereto or thereby. The sealant SS may include a plurality of portions spaced apart from each other in the first direction DR1.

The sealant SS may include a synthetic resin and inorganic fillers mixed with the synthetic resin. The synthetic resin of the sealant SS may further include other additives. The additives may include an amine-based curing agent and a photoinitiator. The additives may further include a silane-based additive and an acrylic-based additive.

FIG. 8A shows one transistor TR-D (hereinafter, referred to as a "driving transistor") among the transistors shown in FIG. 7. In addition, FIG. 8A shows second and third signal lines SL2 and SL3 among the signal lines SL1, SL2, SL3, SL4, and SL5.

The driving transistor TR-D may have substantially the same stack structure as the pixel transistor TR described with reference to FIG. 5. A control electrode G-D of the driving transistor TR-D may be disposed on the same layer as and may be formed through the same process as the control electrode GE of FIG. 5. That is, the control electrode G-D may include substantially the same material as and may substantially the same stack structure as the control electrode GE. An input electrode I-D and an output electrode O-D of the driving transistor TR-D may be disposed on the same layer as and may be formed through the same process as the input electrode IE and the output electrode OE of FIG. 5.

The second signal line SL2 and the third signal line SL3 may be connected to each other by a connection electrode CNE. An area where the connection electrode CNE is disposed may be a first area A1 of FIG. 6. The second signal line SL2 may be disposed on the same layer as and may be formed through the same process as the control electrode GE of FIG. 5. The third signal line SL3 may be disposed on the same layer as and may be formed through the same process as the input electrode IE of FIG. 5.

The connection electrode CNE may be disposed on the third insulating layer 30. The connection electrode CNE may connect the second signal line SL2 and the third signal line SL3 through a contact hole CNT2 defined through the first to third insulating layers 10 to 30 and a contact hole CNT3 defined through the second and third insulating layers 20 and 30.

The connection electrode CNE may be disposed on the same layer as and may be formed through the same process as the pixel electrode PXE of FIG. 5. The connection electrode CNE may form a portion of the scan driving circuit in terms of equivalent circuits.

The first display substrate 100 may include an insulating pattern IP that is disposed on the third insulating layer 30 and covers the connection electrode CNE. The insulating pattern IP may be disposed between the third insulating layer 30 and the sealant SS. The insulating pattern IP may make contact with the sealant SS. The insulating pattern IP may be surrounded by the sealant SS. The insulating pattern IP may include an insulating material. The insulating pattern IP may include the same material as and may be formed through the same process as the spacer CS.

As the insulating pattern IP protects the connection electrode CNE, the scan driving circuit may be prevented from being defected. The insulating pattern IP may prevent corrosion and deformation of the connection electrode CNE.

As shown in FIG. 8B, the display panel DP may further include metal particles MP mixed with the sealant SS. The metal particles MP may make contact with at least one of the insulating pattern IP and the second display substrate 200.

The metal particles MP are formed by a conductive foreign substance infiltrating into a sealant composition when the sealant SS is formed. The metal particles are described as a representative example of a conductive foreign substance. However, the conductive foreign substance should not be so limited. The insulating pattern IP may cover the connection electrode CNE to prevent an occurrence of electrical defects caused when the conductive foreign substance makes contact with the connection electrode CNE. In particular, although the conductive foreign substance infiltrates, a short circuit between the common electrode CE and the connection electrode CNE due to the conductive foreign substance may be prevented by the insulating pattern IP.

Figure 9:
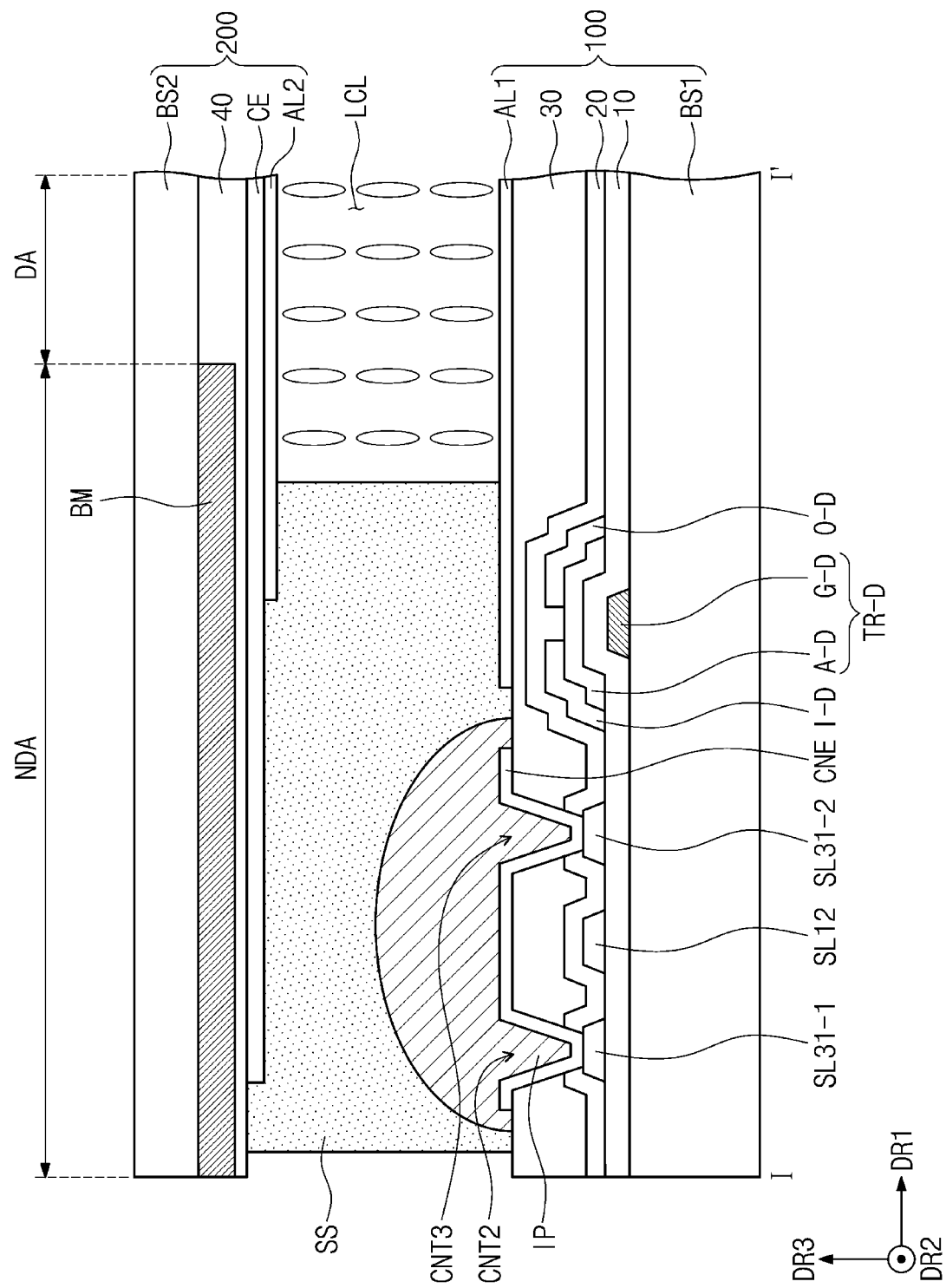
FIGS. 9, 10, and 11 are cross-sectional views showing a display panel according to an exemplary embodiment of the invention.
Figure 10:
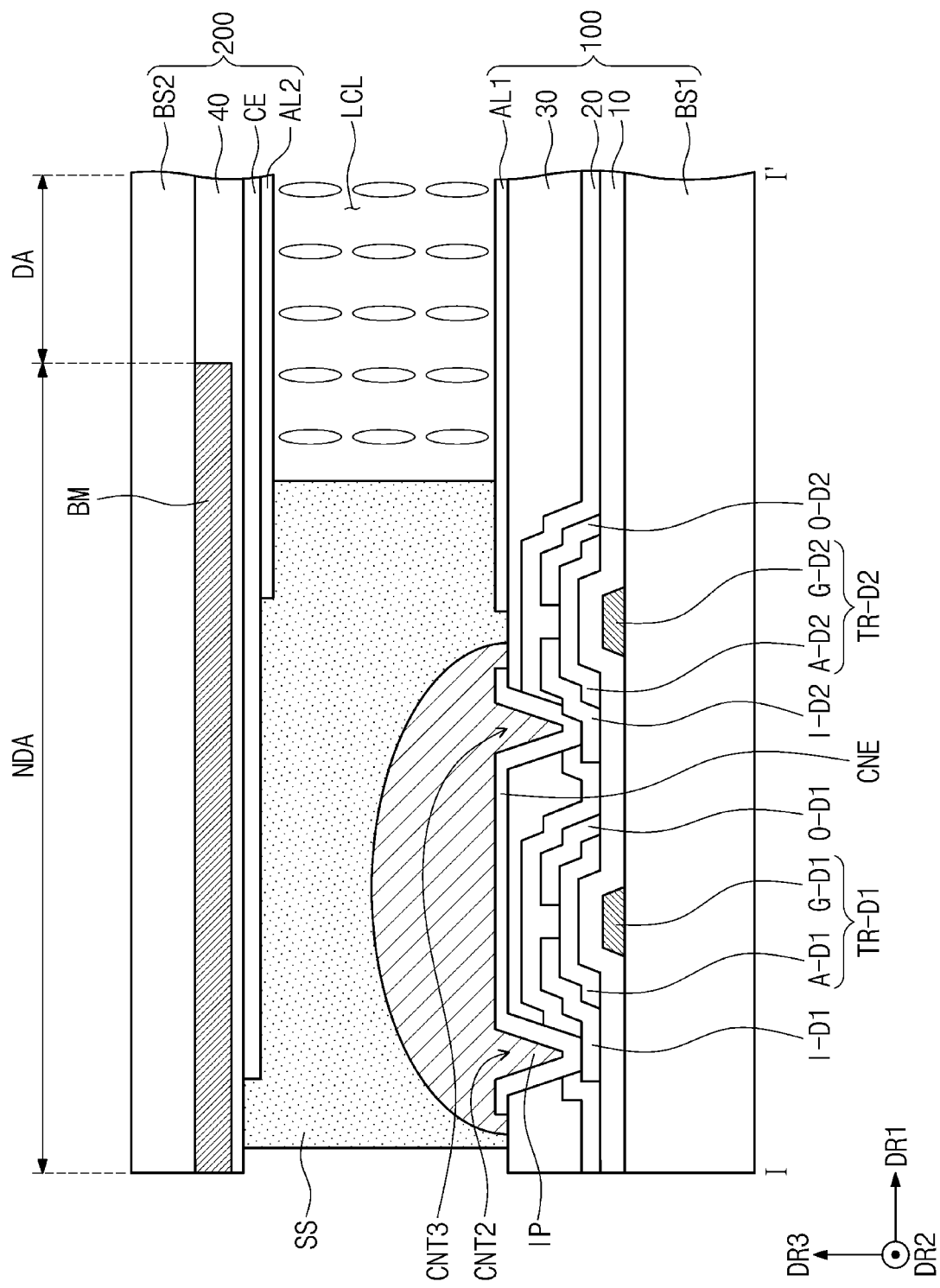
Figure 11:
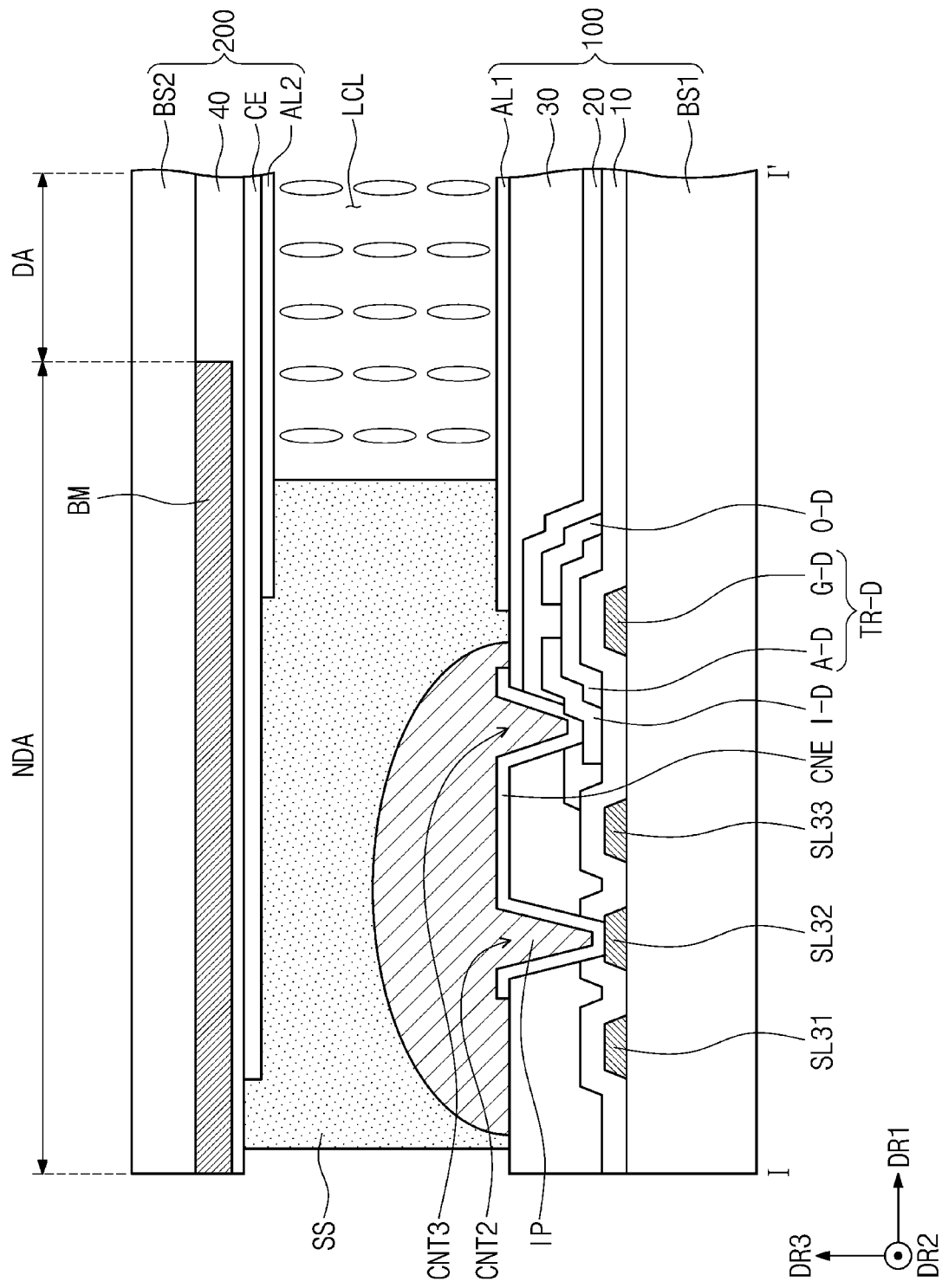

FIGS. 9 to 11 are cross-sectional views showing a display panel DP according to an exemplary embodiment of the invention. Hereinafter, in FIGS. 9 to 11, detailed descriptions of the same elements as the elements described with reference to FIGS. 1 to 8B will be omitted.

FIG. 9 shows the cross-section corresponding to a second area A2 of FIG. 6. As shown in FIG. 9, the first sub-signal line SL31 of the third signal line SL3 and the second sub-signal line SL12 of the first signal line SL1 may be disposed on the same layer as the input electrode I-D of the driving transistor TR-D. However, the inventive concepts should not be limited thereto or thereby. That is, the first sub-signal line SL31 of the third signal line SL3 and the second sub-signal line SL12 of the first signal line SL1 may be disposed on the same layer as and may be formed through the same process as the control electrode G-D.

The first sub-signal line SL31 of the third signal line SL3 may include a first portion SL31-1 and a second portion SL31-2. The connection electrode CNE may connect the first portion SL31-1 and the second portion SL31-2 through contact holes CNT2 and CNT3 defined through the second and third insulating layers 20 and 30.

FIG. 10 shows two transistors TR-D1 and TR-D2 among the transistors shown in FIG. 7. A first driving transistor TR-D1 and a second driving transistor TR-D2 may be connected to each other by the connection electrode CNE.

The connection electrode CNE may connect an input electrode I-D1 of the first driving transistor TR-D1 and an input electrode I-D2 of the second driving transistor TR-D2 through contact holes CNT2 and CNT3 defined through second and third insulating layers 20 and 30.

The connection electrode CNE may be connected to one of the signal lines SL1, SL2, SL3, SL4, and SL5 (refer to FIG. 6). The connection between the input electrode I-D1 and the input electrode I-D2 corresponds to the connection relationship between two electrodes. However, the inventive concepts should not be limited thereto or thereby.

FIG. 11 shows a portion of the scan driving circuit GDC (refer to FIG. 2). The first sub-signal line SL31, the second sub-signal line SL32, and the third sub-signal line SL33 of the third signal line SL3 and one driving transistor TR-D are shown as a representative example. The third signal line SL3 is shown as one of the signal lines SL1, SL2, SL3, SL4, and SL5 (refer to FIG. 6).

The second sub-signal line SL32 and one electrode of the driving transistor TR-D may be connected to each other by the connection electrode CNE. The connection electrode CNE may connect the second sub-signal line SL32 and the input electrode I-D of the driving transistor TR-D through contact holes CNT2 and CNT3 defined through the first to third insulating layers 10 to 30.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display panel comprising:
   a first display substrate including a display area and a non-display area disposed outside the display area;
   a second display substrate facing the first display substrate; and
   a sealant overlapping the non-display area and coupling the first display substrate and the second display substrate, wherein
   the first display substrate comprises:
      a plurality of insulating layers;
      a first driving circuit that provides one of a data signal and a gate signal to a plurality of pixels via an output terminal, the first driving circuit overlapping the non-display area and comprising a first electrode disposed on the plurality of insulating layers, and
      a signal line, the first driving circuit connected to the signal line; and
   a protruding pattern disposed on the plurality of insulating layers, covering the first electrode, making direct contact with one of the plurality of insulating layers, and making direct contact with the sealant, and
   the protruding pattern directly contacts both the sealant and one of the first electrode and the one of the plurality of insulating layers directly beneath the sealant at a common point.

2. The display panel of claim 1, wherein:
   the plurality of insulating layers comprise a first insulating layer, a second insulating layer disposed on the first insulating layer, and a third insulating layer disposed on the second insulating layer; and
   the first display substrate further comprises:
      a first line overlapping the display area and connected to the first driving circuit;
      a transistor overlapping the display area and connected to the first line; and
      a pixel electrode disposed on the plurality of insulating layers and connected to the transistor.

3. The display panel of claim 2, wherein the transistor comprises a control electrode disposed under the first insulating layer, an input electrode disposed between the second insulating layer and the third insulating layer, and an output electrode disposed between the second insulating layer and the third insulating layer.

4. The display panel of claim 3, wherein the pixel electrode is disposed on the third insulating layer and connected to the output electrode through a contact hole defined through the second insulating layer and the third insulating layer.

5. The display panel of claim 4, wherein the first electrode is disposed on a same layer as the pixel electrode and comprises a same material as the pixel electrode.

6. The display panel of claim 2, wherein:
   the first driving circuit comprises a first driving transistor and a second driving transistor; and
   the first electrode connects one electrode of the first driving transistor and one electrode of the second driving transistor.

7. The display panel of claim 6, wherein the transistor has a same stack structure as the first driving transistor.

8. The display panel of claim 2, wherein:
   the signal line comprises:
      a first signal line receiving a clock signal or a reference voltage; and
      a second signal line connected to the first driving circuit; and
   the first electrode connects the first signal line and the second signal line.

9. The display panel of claim 8, wherein either the first signal line or the second signal line is disposed on a same layer as the first line.

10. The display panel of claim 8, wherein the first signal line and the second signal line are disposed on different layers from each other.

11. The display panel of claim 8, wherein:
    the first signal line is disposed under the first insulating layer;
    the second signal line is disposed between the second insulating layer and the third insulating layer; and
    the first electrode connects the first signal line and the second signal line through a first contact hole defined through the first insulating layer, the second insulating layer, and the third insulating layer and a second contact hole defined through the second insulating layer and the third insulating layer.

12. The display panel of claim 2, wherein the first line receives a turn-on signal of the transistor from the first driving circuit.

13. The display panel of claim 1, wherein:
    the signal line comprises:
       a first signal line extending in a first direction; and
       a second signal line extending in a second direction crossing the first direction and connected to the first driving circuit; and
    the second signal line comprises a first portion and a second portion connected to each other by the first electrode.

14. The display panel of claim 1, wherein:
    the first driving circuit comprises a driving transistor; and
    the first electrode connects one electrode of the driving transistor and the signal line.

15. The display panel of claim 1, further comprising a metal particle mixed with the sealant, wherein
the metal particle makes contact with at least one of the protruding pattern and the second display substrate.

16. The display panel of claim 15, wherein the second display substrate comprises:
a base substrate; and
a common electrode disposed on an inner surface of the base substrate, and the metal particle makes contact with the common electrode.

17. The display panel of claim 1, further comprising a spacer disposed between the first display substrate and the second display substrate, wherein the spacer and the protruding pattern comprise a same material.

18. The display panel of claim 17, wherein the protruding pattern makes contact with the first electrode.

19. The display panel of claim 17, further comprising a metal particle mixed with the sealant, wherein
the second display substrate comprises:
a base substrate; and
a common electrode disposed on an inner surface of the base substrate, and the metal particle makes contact with the common electrode.

20. The display panel of claim 1, wherein the signal line is spaced apart from the output terminal.

21. The display panel of claim 1, wherein the signal line is electrically different than the output terminal.

22. The display panel of claim 1, wherein
the protruding pattern comprises one of a resin and a photosensitive organic material,
the protruding pattern directly contacts an insulating layer directly beneath the sealant and the sealant at a first common point, and
the protruding pattern directly contacts the first electrode and the sealant at a second common point.

23. The display panel of claim 1, wherein
the protruding pattern protrudes into a cavity of the sealant such that a topmost point of the protruding pattern is spaced apart from all walls of the sealant extending in a direction perpendicular to a topmost surface of the first display substrate,
the topmost point of the protruding pattern is above, and vertically spaced apart from, the first electrode and a top surface of the one of the plurality of insulating layers directly beneath the sealant,
a bottom surface of the protruding pattern directly contacts one of the first electrode and the insulating layer directly beneath the sealant, and
the bottom surface of the protruding pattern directly contacts the insulating layer directly beneath the sealant and the sealant at a common point.

24. A display panel comprising:
a first display substrate including a display area and a non-display area disposed outside the display area;
a second display substrate facing the first display substrate; and
a sealant overlapping the non-display area and coupling the first display substrate and the second display substrate;
wherein:
the first display substrate comprises:
a plurality of insulating layers; and
a first driving circuit disposed in the non-display area and comprising a first signal line, a second signal line, a first electrode connecting the first signal line and the second signal line and disposed on a layer different from the first signal line and the second signal line, and a first driving circuit, the first driving circuit providing one of a data signal and a gate signal to a plurality of pixels via an output terminal; and
a protruding pattern making contact with the sealant and protecting the first electrode from the sealants
the protruding pattern makes direct contact with one of the plurality of insulating layers,
the sealant is spaced apart from the first electrode with the protruding pattern interposed therebetween, and
the protruding pattern directly contacts both the sealant and one of the first electrode and the one of the plurality of insulating layers directly beneath the sealant at a common point.

25. A display panel comprising:
a first display substrate including a display area and a non-display area disposed outside the display area;
a second display substrate facing the first display substrate; and
a sealant overlapping the non-display area and coupling the first display substrate and the second display substrate, wherein
the first display substrate comprises:
a plurality of insulating layers;
a first driving circuit that provides one of a data signal and a gate signal to a plurality of pixels via an output terminal, the first driving circuit overlapping the non-display area and comprising a first electrode disposed on the plurality of insulating layers; and
a signal line, the first driving circuit connected to the signal line; and
a protruding pattern disposed on the plurality of insulating layers covering the first electrode, making direct contact with one of the plurality of insulating layers, and making direct contact with the sealant,
the protruding pattern has a rounded upper surface, and
the protruding pattern penetrates into at least one of the insulation layers.

* * * * *